United States Patent
Iwasaki (10) Patent No.: US 12,428,015 B2
(45) Date of Patent: Sep. 30, 2025

(54) INFORMATION NOTIFICATION DEVICE, INFORMATION NOTIFICATION METHOD AND NON-TRANSITORY RECORDING MEDIUM

(71) Applicant: TOYOTA JIDOSHA KABUSHIKI KAISHA, Aichi-ken (JP)

(72) Inventor: Toshiaki Iwasaki, Tokyo-to (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 140 days.

(21) Appl. No.: 18/454,791

(22) Filed: Aug. 24, 2023

(65) Prior Publication Data

US 2024/0227838 A1    Jul. 11, 2024

(30) Foreign Application Priority Data

Jan. 5, 2023  (JP) .................... 2023-000560

(51) Int. Cl.
| | |
|---|---|
| *B60Q 1/00* | (2006.01) |
| *B60W 40/08* | (2012.01) |
| *B60W 50/14* | (2020.01) |

(52) U.S. Cl.
CPC ............ *B60W 50/14* (2013.01); *B60W 40/08* (2013.01); *B60W 2050/143* (2013.01); *B60W 2050/146* (2013.01); *B60W 2540/043* (2020.02)

(58) Field of Classification Search
CPC .............. B60W 50/14; B60W 40/08; B60W 2050/143; B60W 2050/146; B60W 2540/04
USPC ............ 340/425.5, 457, 460, 461, 439
See application file for complete search history.

(56) References Cited

U.S. PATENT DOCUMENTS

| | | | |
|---|---|---|---|
| 9,090,261 B2* | 7/2015 | Kitagishi | G07C 5/008 |
| 10,336,341 B2* | 7/2019 | Asakura | G01C 21/34 |
| 11,203,357 B2* | 12/2021 | Kumai | B60W 50/082 |
| 2017/0174080 A1 | 6/2017 | Ho et al. | |
| 2019/0278263 A1* | 9/2019 | Mason | B60W 40/09 |
| 2020/0189518 A1 | 6/2020 | Sawai et al. | |
| 2020/0216095 A1* | 7/2020 | Isozaki | A61M 21/00 |
| 2021/0039638 A1 | 2/2021 | Yasui | |

FOREIGN PATENT DOCUMENTS

| | | |
|---|---|---|
| JP | H05-325098 A | 12/1993 |
| JP | 2012-058908 A | 3/2012 |
| JP | 2017-117117 A | 6/2017 |
| JP | 2020-098468 A | 6/2020 |
| JP | 2021-026720 A | 2/2021 |
| JP | 2022-046377 A | 3/2022 |
| JP | 2023-030507 A | 3/2023 |

* cited by examiner

*Primary Examiner* — Anh V La
(74) *Attorney, Agent, or Firm* — HAUPTMAN HAM, LLP (57) ABSTRACT

The information notification device includes a processor configured to notify a driver of a vehicle of information, acquire proficiency level information indicating a proficiency level of the driver with respect to use of a driving assistance function installed in the vehicle, and switch a notification mode of information related to the driving assistance function based on the proficiency level information.

20 Claims, 10 Drawing Sheets

| <PROFICIENCY LEVEL> | <VISUAL NOTIFICATION> | <AUDIBLE NOTIFICATION> |
|---|---|---|
| HIGH | ADVANCED DRIVING ASSISTANCE CAN BE STARTED | NONE |
| MEDIUM | ADVANCED DRIVING ASSISTANCE CAN BE STARTED / PRESS [MAIN] SWITCH TO START | NOTIFICATION SOUND (BUZZER SOUND) |
| LOW | ADVANCED DRIVING ASSISTANCE CAN BE STARTED / PRESS [MAIN] SWITCH TO START  | AUDIO MESSAGE |

FIG. 4B

| <PROFICIENCY LEVEL> | <VISUAL NOTIFICATION> | <AUDIBLE NOTIFICATION> |
|---|---|---|
| HIGH | ADVANCED DRIVING ASSISTANCE HAS BEEN STARTED <br> PLEASE DRIVE SAFELY | NONE |
| MEDIUM | ADVANCED DRIVING ASSISTANCE HAS BEEN STARTED <br> DON'T RELY TOO MUCH ON SYSTEM, ALWAYS BE AWARE OF YOUR SURROUNDINGS AND DRIVE SAFELY | NOTIFICATION SOUND (BUZZER SOUND) |
| LOW | ADVANCED DRIVING ASSISTANCE HAS BEEN STARTED <br> ⚠ ALERT <br> ▪ FOR SAFE USE <br> DRIVER IS RESPONSIBLE FOR SAFE DRIVING. DON'T RELY TOO MUCH ON SYSTEM, ALWAYS BE AWARE OF YOUR SURROUNDINGS AND DRIVE SAFELY. | AUDIO MESSAGE |

FIG. 4C

| <PROFICIENCY LEVEL> | <VISUAL NOTIFICATION> | <AUDIBLE NOTIFICATION> |
|---|---|---|
| HIGH |  | NONE |
| MEDIUM |  | NOTIFICATION SOUND (BUZZER SOUND) |
| LOW |  | AUDIO MESSAGE |

FIG. 4D

| <PROFICIENCY LEVEL> | <VISUAL NOTIFICATION> | <AUDIBLE NOTIFICATION> |
|---|---|---|
| HIGH | ELECTRIC PARKING IN OPERATION | NONE |
| MEDIUM | ELECTRIC PARKING IN OPERATION<br>STARTING>ACCELERATOR OPERATION OR [RESUME] BUTTON | NOTIFICATION SOUND (BUZZER SOUND) |
| LOW | ELECTRIC PARKING IS IN OPERATION.<br>⇒ LIGHTLY STEP ON ACCELERATOR OR PRESS [RESUME] BUTTON TO START<br> | AUDIO MESSAGE |

INFORMATION NOTIFICATION DEVICE, INFORMATION NOTIFICATION METHOD AND NON-TRANSITORY RECORDING MEDIUM

FIELD

The present disclosure relates to an information notification device, an information notification method, and a non-transitory recording medium.

BACKGROUND

Patent Literature 1 discloses a vehicular driving warning device configured to detect a degree of fatigue or arousal of a driver as driver status information, determine a degree of necessity of a warning based on the driver status information, etc., and issue a warning in a manner corresponding to the determination.

Patent Literature 2 discloses a driving assistance device configured to switch the content of the notification to the driver based on the degree of dissociation between the risk-area around the vehicle and the position of the line of sight of the driver.

Patent Literature 3 discloses an alert device configured to, when it is determined that an alert to a driver is required based on a driver status recognized based on a captured image of a driver monitor camera, provide the driver with a stimulus for directing a consciousness to the driving of the vehicle with an intensity corresponding to the driving mode being executed.

CITATIONS LIST

Patent Literature

[PTL 1] Japanese Unexamined Patent Publication No. 05-325098
[PTL 2] Japanese Unexamined Patent Publication No. 2021-026720
[PTL 3] Japanese Unexamined Patent Publication No. 2020-098468

SUMMARY

Technical Problem

In recent years, with the development of sensing technology, etc., a vehicle having a driving assistance function has been developed. In order to support the driver to appropriately use the driving assistance function, it is desirable to notify the driver of information related to the driving assistance function.

However, the granularity of information necessary for the driver to smoothly use the driving assistance function varies according to the proficiency level of the driving assistance function. For this reason, when the notification mode of the information related to the driving assistance function is uniform, there is a possibility that the information becomes excessive for a driver with a high level of proficiency, or the information becomes insufficient for a driver with a low level of proficiency.

Therefore, in view of the above problem, an object of the present disclosure is to notify a driver of information that is not excessive or insufficient in accordance with a proficiency level of the driver, regarding a driving assistance function installed in a vehicle.

Solution to Problem

The summary of the present disclosure is as follows.

(1) An information notification device comprising a processor configured to: notify a driver of a vehicle of information; acquire proficiency level information indicating a proficiency level of the driver with respect to use of a driving assistance function installed in the vehicle; and switch a notification mode of information related to the driving assistance function based on the proficiency level information.

(2) The information notification device described in above (1), wherein the processor is configured to increases an amount of information to be notified to the driver as the proficiency level of the driver decreases.

(3) The information notification device described in above (1) or (2), wherein the processor is further configured to determine the proficiency level of the driver based on a usage status of the driving assistance function by the driver.

(4) The information notification device described in any one of above (1) to (3), wherein the proficiency level information is stored in a portable terminal carried by the driver, and the processor is configured to acquire the proficiency level information from the portable terminal through a short-range wireless communication.

(5) The information notification device described in above (4), wherein the portable terminal is a wireless key of the vehicle.

(6) The information notification device described in any one of above (1) to (3), wherein the proficiency level information is stored in a server external to the vehicle, and the processor is configured to acquire the proficiency level information from the server through a wide-area wireless communication.

(7) An information notification method executed by a computer, comprising: acquiring proficiency level information indicating a proficiency level of a driver of a vehicle with respect to use of a driving assistance function installed in the vehicle; and switching a notification mode of information related to the driving assistance function based on the proficiency level information when notifying the driver of information related to the driving assistance function.

(8) A non-transitory recording medium having recorded thereon a computer program, the computer program causing a computer to: acquire proficiency level information indicating a proficiency level of a driver of a vehicle with respect to use of a driving assistance function installed in the vehicle, and switch a notification mode of information related to the driving assistance function based on the proficiency level information when notifying the driver of information related to the driving assistance function.

According to the present disclosure, it is possible to notify a driver of information that is not excessive or insufficient in accordance with a proficiency level of the driver, regarding a driving assistance function installed in a vehicle.

DESCRIPTION OF EMBODIMENTS

Hereinafter, embodiments of the present disclosure will be described in detail with reference to the drawings. In the following descriptions, the same reference numerals are given to the same constituent elements.

First Embodiment

Figure 1:
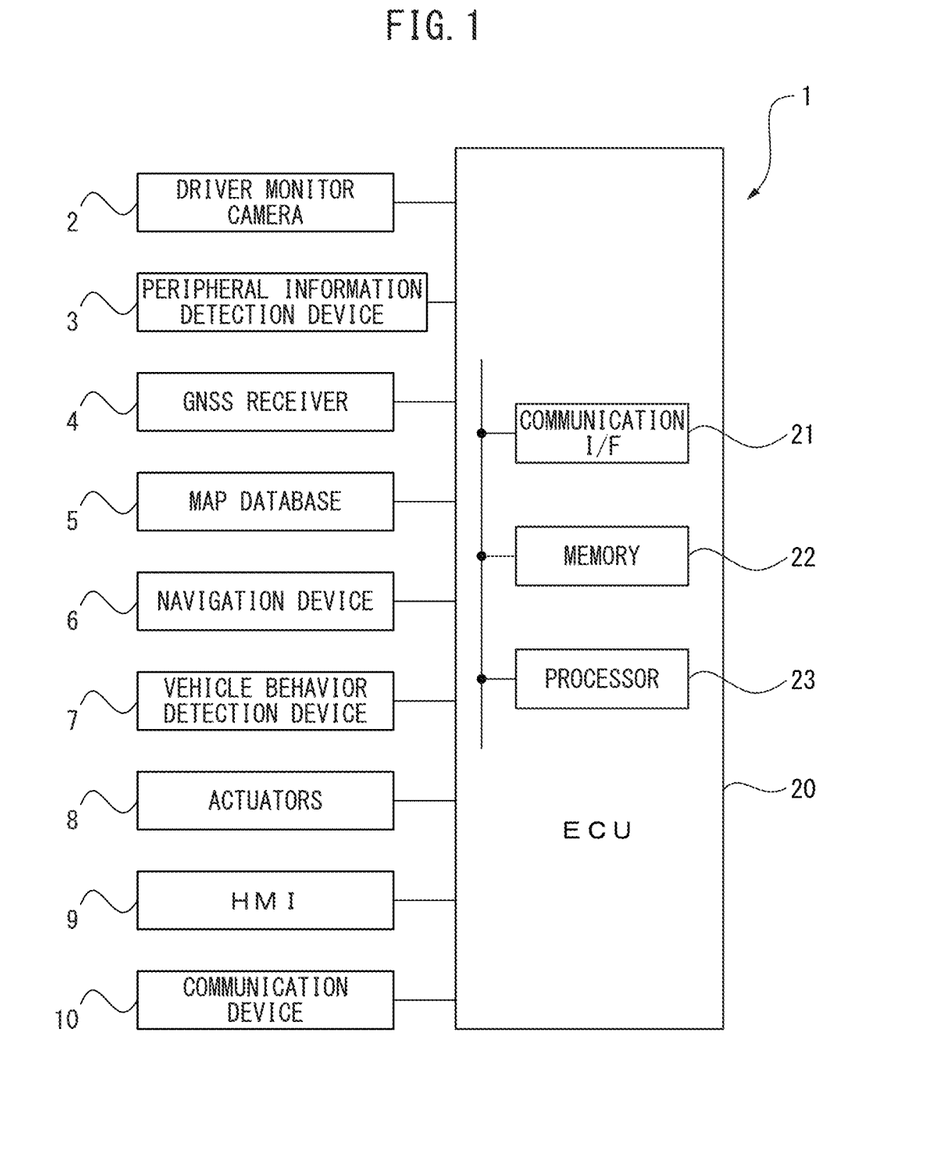
FIG. 1 is a schematic configuration diagram of a vehicle control system including an information notification device according to a first embodiment of the present disclosure.

Hereinafter, a first embodiment of the present disclosure will be described referring to FIG. 1 to FIG. 4D. FIG. 1 is a schematic configuration diagram of a vehicle control system 1 including an information notification device according to a first embodiment of the present disclosure. The vehicle control system 1 is mounted on a vehicle and executes various types of control of the vehicle.

As shown in FIG. 1, the vehicle control system 1 includes a driver monitor camera 2, a peripheral information detection device 3, a GNSS (Global Navigation Satellite System) receiver 4, a map database 5, a navigation device 6, a vehicle behavior detection device 7, actuators 8, a human machine interface (HMI) 9, a communication device 10 and an electronic control unit (ECU) 20. The driver monitor camera 2, the peripheral information detection device 3, the GNSS receiver 4, the map database 5, the navigation device 6, the vehicle behavior detection device 7, the actuators 8, the HMI 9 and the communication device 10 are electrically connected to the ECU 20 via an in-vehicle network compliant with standards such as CAN (Controller Area Network), etc.

The driver monitor camera 2 captures a face of the driver of the vehicle and generates an image representing the face of the driver. The output of the driver monitor camera 2, i.e., the image generated by the driver monitor camera 2, is transmitted to the ECU 20.

The peripheral information detection device 3 acquires data (images, point cloud data, etc.) around the vehicle and detects peripheral information (for example, surrounding vehicles, lanes, pedestrians, bicycles, traffic lights, signs, etc.) of the vehicle. For example, the peripheral information detection device 3 includes a camera (monocular camera or stereo camera), a millimeter-wave radar, a LIDAR (Laser Imaging Detection And Ranging) or an ultrasonic sensor (sonar), or any combination thereof. Note that the peripheral information detection device 3 may further include an illuminance sensor, a rain sensor, etc. The output of the peripheral information detection device 3, i.e., the peripheral information of the vehicle detected by the peripheral information detection device 3 is transmitted to the ECU 20.

The GNSS receiver 4 detects the present position of the vehicle (for example, the latitude and longitude of the vehicle) based on positioning information obtained from a plurality of (for example, three or more) positioning satellites. Specifically, the GNSS receiver 4 captures a plurality of positioning satellites and receives radio waves transmitted from the positioning satellites. Then, the GNSS receiver 4 calculates the distance to each of the positioning satellites based on the difference between the transmission time and the reception time of the radio wave, and detects the present position of the vehicle based on the distance to the positioning satellite and the position (orbit information) of the positioning satellite. The output of the GNSS receiver 4. i.e., the present position of the vehicle detected by the GNSS receiver 4, is transmitted to the ECU 20. The GPS (Global Positioning System) receiver is an example of the GNSS receiver.

The map database 5 stores map information. The ECU 20 obtains map information from the map database 5. Note that a map database may be provided outside the vehicle (e.g., a server, etc.), and the ECU 20 may acquire map information from outside the vehicle.

The navigation device 6 sets the travel route of the vehicle to the destination based on the present position of the vehicle detected by the GNSS receiver 4, the map information in the map database 5, the input by the occupant (for example, a driver) of the vehicle, etc. The travel route set by the navigational device 6 is transmitted to the ECU 20.

The vehicle behavior detection device 7 detects behavior information of the vehicle. The vehicle behavior detection device 7 includes, for example, a vehicle speed sensor that detects the speed of the vehicle, a yaw rate sensor that detects the yaw rate of the vehicle, etc. The output of the vehicle behavior detection device 7, i.e. the behavior information of the vehicle detected by the vehicle behavior detection device 7, is transmitted to the ECU 20.

The actuators 8 operate the vehicle. For example, the actuators 8 include a drive device (for example, at least one of an internal combustion engine and an electric motor) for acceleration of the vehicle, a brake actuator for braking (decelerating) of the vehicle, a steering actuator for steering of the vehicle, etc. The ECU 20 controls the actuators 8 to control the behavior of the vehicle.

The HMI 9 communicates information between the vehicle and an occupant (e.g., a driver) of the vehicle. The HMI 9 includes an output unit (for example, a display, a speaker, a vibrating unit, etc.) that provides information to the occupant of the vehicle, and an input unit (for example, a touch panel, an operation button, an operation switch, a microphone, etc.) to which information is input by the occupant of the vehicle. The output of the ECU 20 is notified to the occupant of the vehicle via the HMI 9, and the input from the occupant of the vehicle is transmitted to the ECU 20 via the HMI 9. The HMI 9 is an example of an input device, an output device or an input/output device. Note that the input/output terminal (a smart phone, a tablet terminal, etc.) of the occupant of the vehicle may be connected to the ECU 20 so as to be able to communicate with the ECU 20 by wire or wirelessly, and may function as a HMI 9. The HMI 9 may be integral with the navigational device 6.

The communication device 10 is capable of communicating with the outside of the vehicle, and enables communication between the vehicle and the outside of the vehicle. The communication device 10 includes, for example, a wide-area wireless communication module that enables wide-area wireless communication between the vehicle and the outside of vehicle (e.g., a server) via a communication network such as a carrier network and an Internet network, and a short-range wireless communication module that enables short-range wireless communication using a communication standard such as Bluetooth (registered trademark) or ZigBee (registered trademark), or short-range wireless communication using the frequency of LF (Low Frequency) or RF (Radio Frequency). The ECU 20 communicates with the outside of the vehicle via the communication device 10.

The ECU 20 performs various controls of the vehicle. As shown in FIG. 1, the ECU 20 includes a communication interface 21, a memory 22 and a processor 23. The communication interface 21 and the memory 22 are connected to the processor 23 via signal lines. In the present embodiment, one ECU 20 is provided, but a plurality of ECUs may be provided for each function. The ECU 20 is an example of an information notification device.

The communication interface 21 has an interface circuitry for connecting the ECU 20 to the in-vehicle networking. The ECU 20 is connected to other in-vehicle devices via the communication interface 21.

The memory 22 includes, for example, a volatile semiconductor memory and a non-volatile semiconductor memory. The memory 22 stores programs, data, etc., used when various kinds of processing are executed by the processor 23.

The processor 23 includes one or more CPU (Central Processing Unit) and its peripheral circuitry. Note that the processor 23 may further include an arithmetic circuit such as a logical arithmetic unit or a numerical arithmetic unit.

In the present embodiment, a plurality of driving assistance functions are installed in the vehicle. The vehicle control system 1 functions as an advanced driving assistance system (ADAS) and realizes each of a plurality of driving assistance functions.

Figure 2:
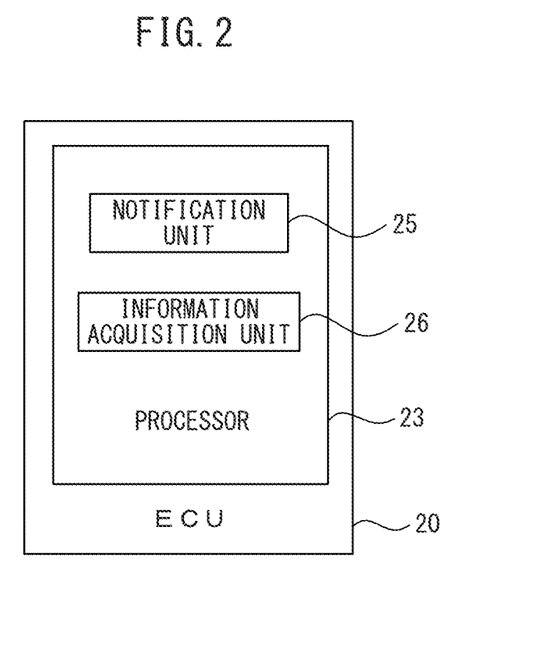
FIG. 2 is a functional block diagram of a processor of the ECU in the first embodiment.

FIG. 2 is a functional block diagram of the processor 23 of the ECU 20 in the first embodiment. In the present embodiment, the processor 23 includes a notification unit 25 and an information acquisition unit 26. The notification unit 25 and the information acquisition unit 26 are functional modules realized by the processor 23 of the ECU 20 executing a computer program stored in the memory 22 of the ECU 20. Note that each of these functional modules may be realized by a dedicated arithmetic circuit provided in the processor 23.

The notification unit 25 notifies the driver of the vehicle of the information. In the present embodiment, the notification unit 25 notifies the driver of the information via the HMI 9 when a predetermined notification event occurs. For example, the notification unit 25 notifies the driver of information related to the driving assistance function when a notification event related to the driving assistance function occurs. Accordingly, it is possible to assist the driver to appropriately use the driving assistance function.

However, the granularity of information necessary for the driver to smoothly use the driving assistance function varies according to the proficiency level of the driving assistance function. For this reason, when the notification mode of the information related to the driving assistance function is uniform, there is a possibility that the information becomes excessive for a driver with a high level of proficiency, or the information becomes insufficient for a driver with a low level of proficiency.

Therefore, in the present embodiment, the information acquisition unit 26 acquires the proficiency level information indicating the proficiency level of the driver with respect to the use of the driving assistance function installed in the vehicle, and the notification unit 25 switches the notification mode of the information related to the driving assistance function based on the proficiency level information acquired by the information acquisition unit 26. As a result, it is possible to notify the driver of information that is not excessive or insufficient in accordance with the proficiency level of the driver, regarding the driving assistance function mounted on the vehicle.

Figure 3:
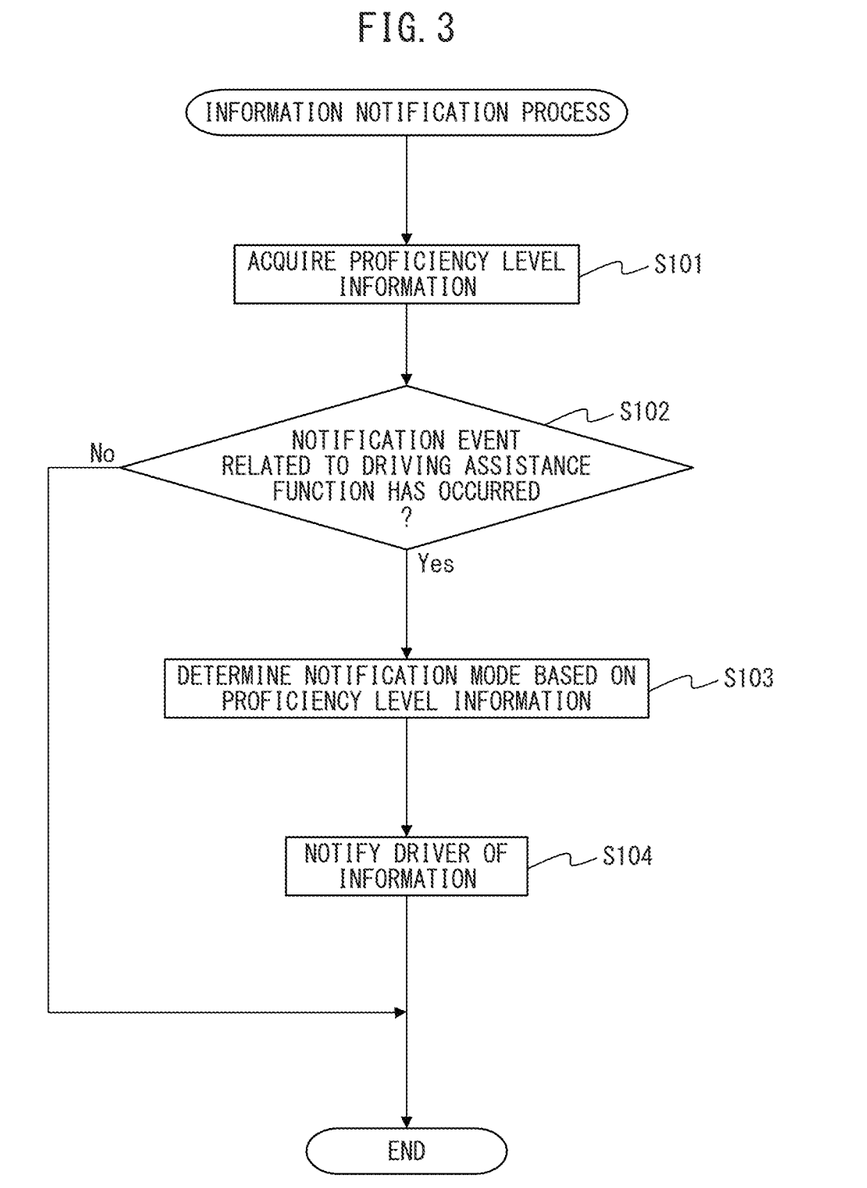
FIG. 3 is a flow chart showing the control routine of the information notification process in the first embodiment.

Hereinafter, the above-described control will be described in detail with reference to FIG. 3. FIG. 3 is a flow chart showing the control routine of the information notification process in the first embodiment. The control routine is repeatedly executed by the processor 23 (specifically, the notification unit 25 and the information acquisition unit 26) of the ECU 20 at predetermined intervals.

First, in the step S101, the information acquisition unit 26 acquires proficiency level information indicating the proficiency level of the driver with respect to the usage of the driving assistance function installed in the vehicle. In the present embodiment, the proficiency level of the driver is determined based on the advance report by the driver. For example, the driver inputs the proficiency level for each of the plurality of driving assistance functions to the HMI 9, and the proficiency level input by the driver is stored in the memory 22 of the ECU 20, etc., as proficiency level information. Note that the driver may collectively input the proficiency level for the plurality of driving assistance functions.

Also, if a plurality of persons use a single vehicle, a wireless key having a different identification number is typically assigned to each of the plurality of persons. For this reason, when the proficiency level is input by the driver via the HMI 9, the identification number of the wireless key existing inside the vehicle may be stored as the proficiency level information together with the proficiency level. In this case, the information acquisition unit 26 identifies the driver based on the identification number of the wireless key of the vehicle, and acquires the proficiency level information corresponding to the identified driver. Further, when the proficiency level is inputted by the driver via the HMI 9, the image of the driver generated by the driver monitor camera 2 may be stored as proficiency level information together with the proficiency level. In this case, the information acquisition unit 26 identifies the driver based on the image of the driver generated by the driver monitor camera 2, and acquires proficiency level information corresponding to the identified driver. Further, the driver may input identification information (for example, a user ID, a user name, etc.) of the driver together with the proficiency level, and the identification information of the driver may be stored as the proficiency level information together with the proficiency level. In this case, the information acquisition unit 26 identifies the driver based on the identification information inputted to the HMI 9 by the driver, and acquires the proficiency level information corresponding to the identified driver. According to these methods, even if a plurality of persons use a single vehicle, it is possible to prevent the proficiency level of another person from being referred to.

Next, in the step-wise S102, the notification unit 25 determines whether or not a notification event related to the driving assistance function has occurred. The notification event occurs at a timing at which an operation state, an operation method, etc., of the driving assistance function is notified to the driver. If it is determined that no notification event has occurred, the present control routine ends. On the other hand, if it is determined that a notification event has occurred, the control routine proceeds to the step S103.

In the step S103, the notification unit 25 determines the notification mode of the information related to the driving assistance function based on the proficiency level information acquired by the information acquisition unit 26. For example, the notification unit 25 increases the amount of information to be notified to the driver as the proficiency level of the driver decreases. As a result, it is possible to provide necessary information to a driver having a low level of proficiency and to prevent a driver having a high level of proficiency from finding notifications annoying FIG. 4A to FIG. 4D are diagrams illustrating specific embodiments of the notification mode according to the proficiency level of the driver. In these examples, the proficiency level of the driver is classified into three stages (low, medium, and high), and information is notified to the driver by visual and audible notifications. In the visual notification, a text message or a text message and an image are displayed on the display of the HMI 9, and in the auditory notification, a notification sound or an audio message is output from the speaker of the HMI 9.

Figure 4A:
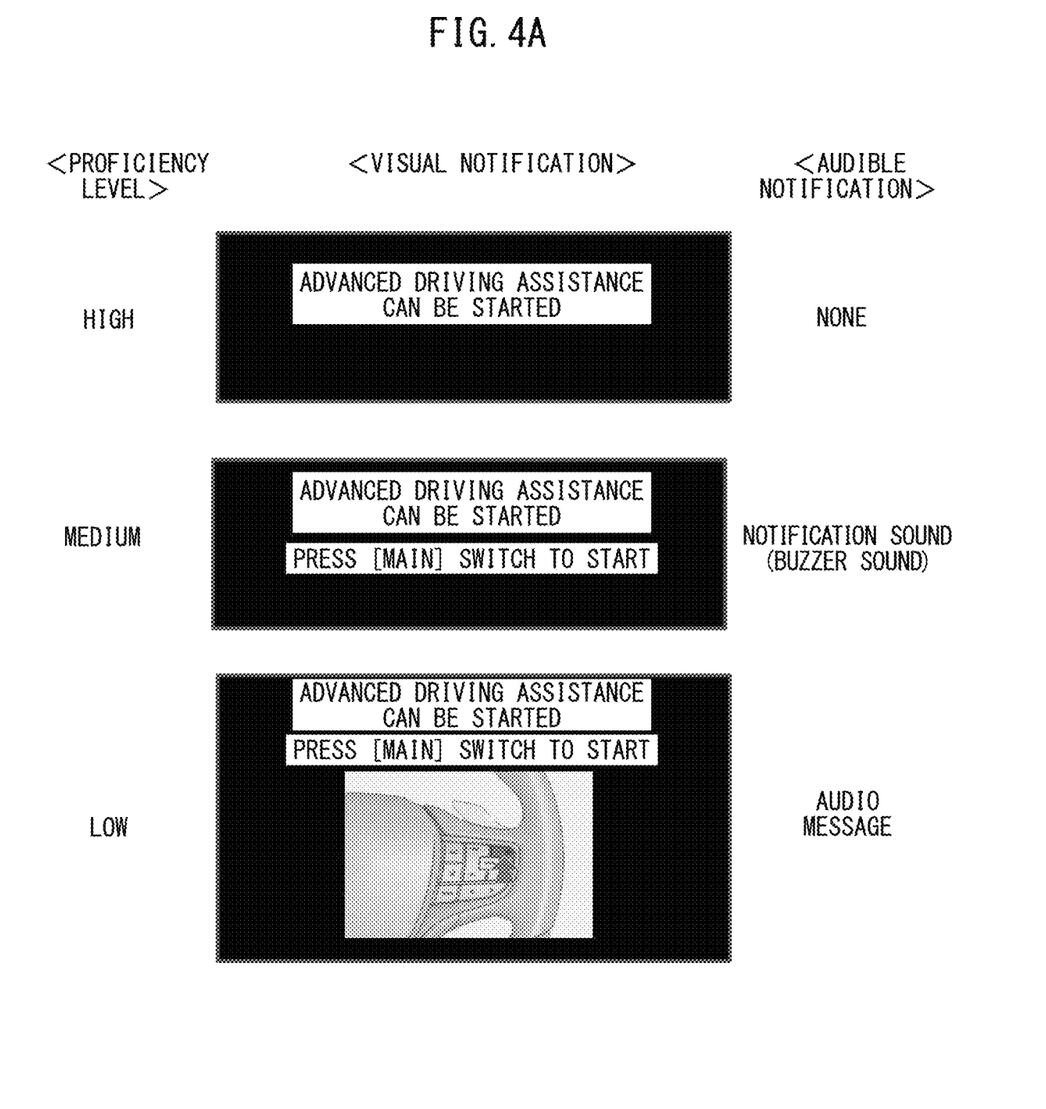
FIG. 4A is a diagram illustrating a specific example of the notification mode according to the proficiency level of the driver.
Figure 4B:
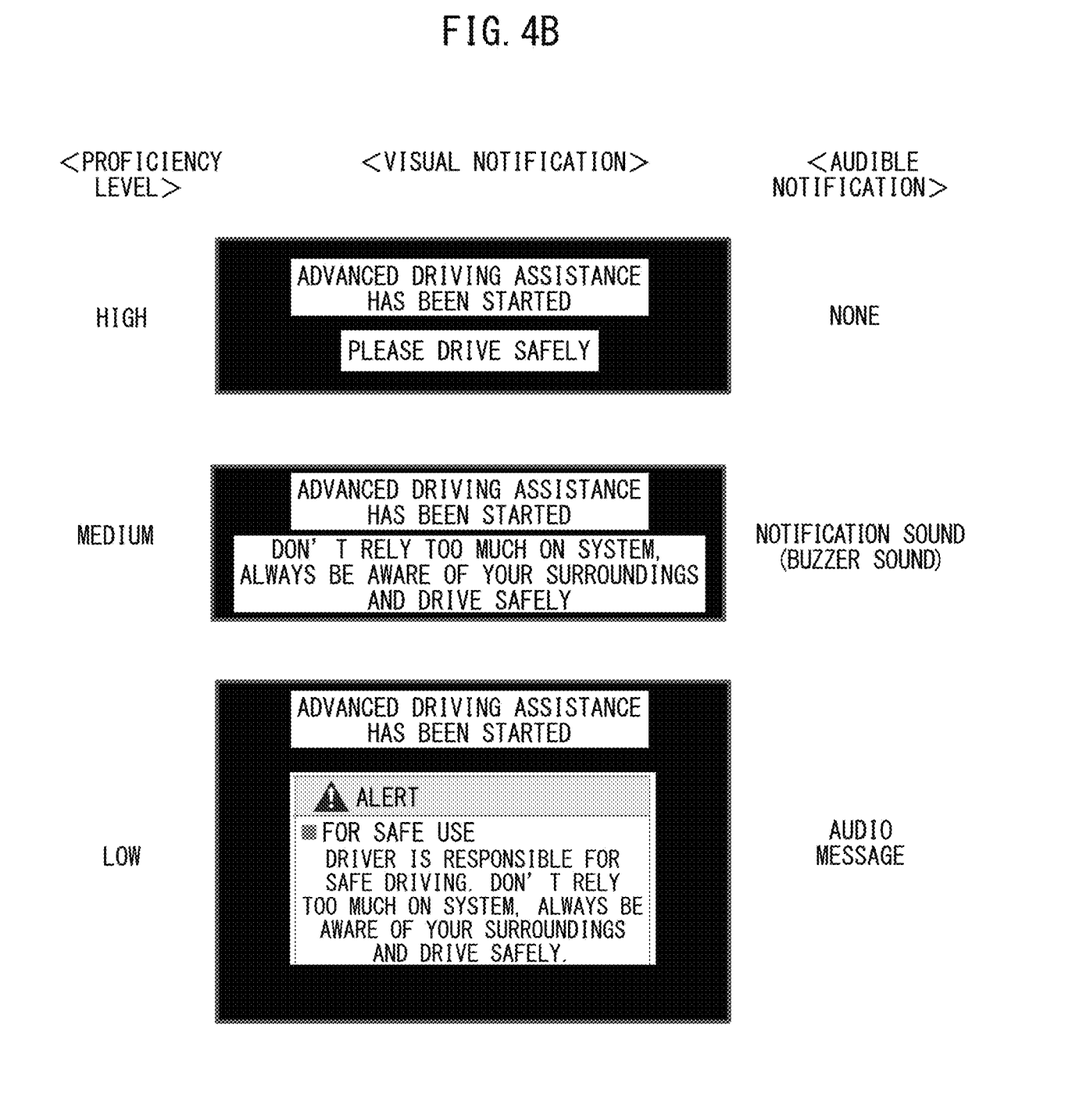
FIG. 4B is a diagram illustrating a specific example of the notification mode according to the proficiency level of the driver.
Figure 4C:
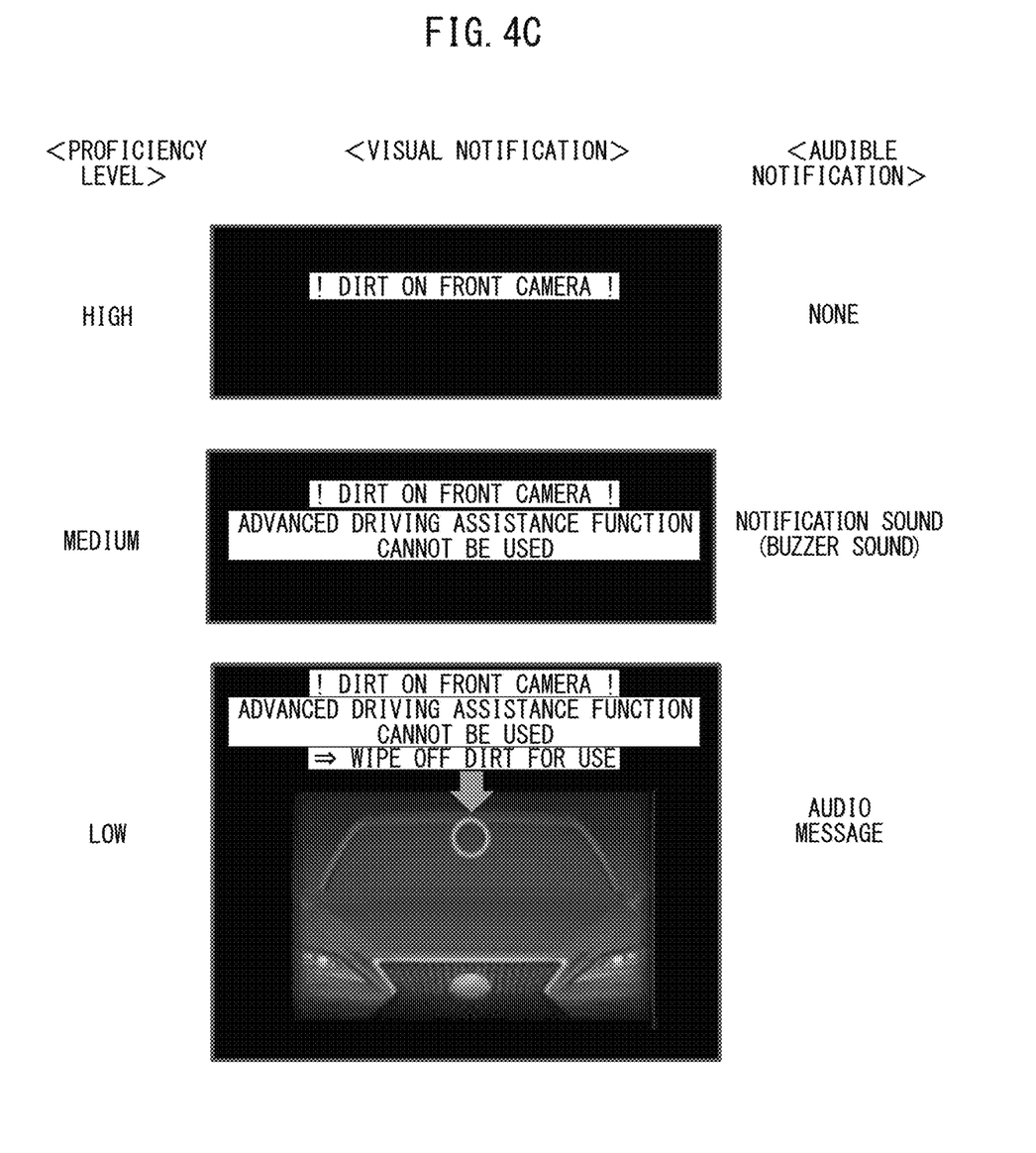
FIG. 4C is a diagram illustrating a specific example of the notification mode according to the proficiency level of the driver.

In the examples of FIG. 4A to FIG. 4C, information relating to advanced driving assistance (advanced drive) is notified. The advanced driving assistance is a driving assistance function that automatically controls the traveling of a vehicle on a road dedicated to an automobile under monitoring by a driver. Therefore, when the advanced driving assistance is activated, the ECU 20 performs autonomous traveling of the vehicle using the actuators 8, etc.

In the example of FIG. 4A, when the advanced driving assistance is not activated, the driver is notified that the advanced driving assistance can be started. When the proficiency level of the driver is "high", information is notified to the driver only by visual notification. Specifically, a text message indicating that the advanced driving assistance can be started is displayed on the display of the HMI 9. When the proficiency level of the driver is "medium", information is notified to the driver by visual notification and audible notification. Specifically, a text message indicating that the advanced driving assistance can be started and a method of starting the advanced driving assistance is displayed on the display of the HMI 9 display, and a notification sound (buzzer sound) is output from the speaker of the HMI 9. When the proficiency level of the driver is "low", information is notified to the driver by visual notification and audible notification. Specifically, in addition to a text message indicating that the advanced driving assistance can be started and a method of starting the advanced driving assistance, an image indicating a method of starting the advanced driving assistance is displayed on the display of the HMI 9, and a text message displayed on the display is output from the speaker of the HMI 9 as an audio message. Therefore, in the example of FIG. 4A, the lower the proficiency level of the driver, the larger the amount of information notified to the driver.

In the example of FIG. 4 B, the driver is notified that the advanced driving assistance has been started in response to the driver executing an operation for starting the advanced driving assistance. When the proficiency level of the driver is "high", information is notified to the driver only by visual notification. Specifically, a text message indicating that advanced driving assistance has been started and a brief precaution is displayed on the display of the HMI 9. When the proficiency level of the driver is "medium", information is notified to the driver by visual notification and audible notification. Specifically, a text message indicating that advanced driving assistance has been started and detailed precautions are displayed on the display of the HMI 9, and a notification sound (buzzer sound) is output from the speaker of the HMI 9. When the proficiency level of the driver is "low", information is notified to the driver by visual notification and audible notification. Specifically, in addition to a text message indicating that advanced driving assistance has been started and detailed precautions, an image indicating an alert is displayed on the display of the HMI 9, and a text message displayed on the display is output from the speaker of the HMI 9 as an audio message. Therefore, in the example of FIG. 4B, the lower the proficiency level of the driver, the larger the amount of information notified to the driver.

In the example of FIG. 4C, when the advanced driving assistance is unavailable, the driver is notified of the reason why the advanced driving assistance is unavailable (specifically, dirt on the front camera). When the proficiency level of the driver is "high", information is notified to the driver only by visual notification. Specifically, a text message indicating the reason why advanced driving assistance is unavailable is displayed on the display of the HMI 9. When the proficiency level of the driver is "medium", information is notified to the driver by visual notification and audible notification. Specifically, a text message indicating the reason why the advanced driving assistance is unavailable and that the advanced driving assistance is unavailable is displayed on the display of the HMI 9, and a notification sound (buzzer sound) is output from the speaker of the HMI 9. When the proficiency level of the driver is "low", information is notified to the driver by visual notification and audible notification. Specifically, in addition to the text message indicating the reason why the advanced driving assistance is unavailable, that the advanced driving assistance is unavailable, and a method of solving the cause, an image indicating the position of the cause is displayed on the display of the HMI 9, and the text message displayed on the display is output from the speaker of the HMI 9 as an audio message. Therefore, in the example of FIG. 4C, the lower the proficiency level of the driver, the larger the amount of information notified to the driver.

Figure 4D:
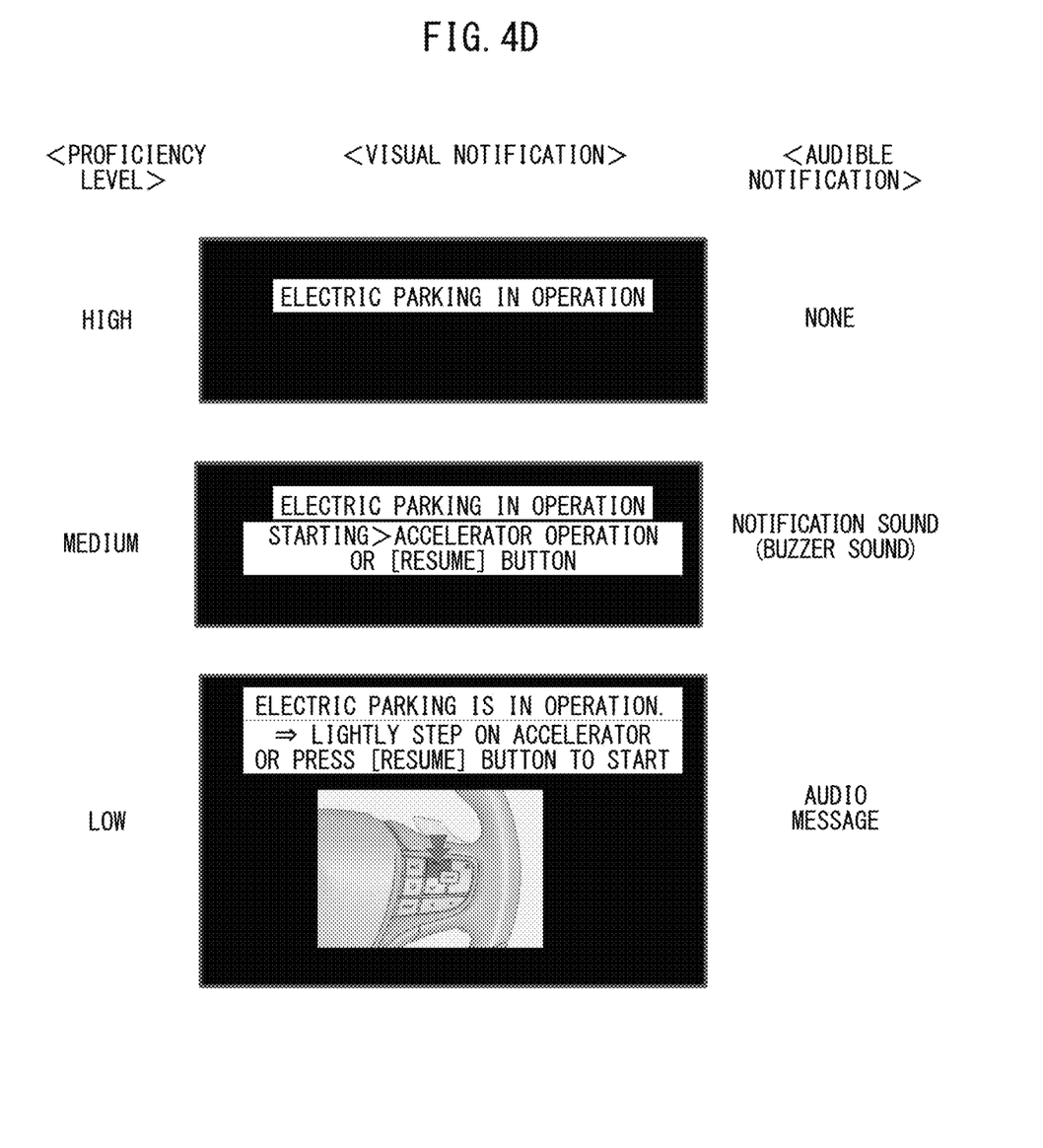
FIG. 4D is a diagram illustrating a specific example of the notification mode according to the proficiency level of the driver.

In the example of FIG. 4D, when the electric parking is being activated, information related to the electric parking is notified. The electric parking is a driving assistance function of operating a parking brake by an electric motor in response to a switch operation by a driver, etc. When the proficiency level of the driver is "high", information is notified to the driver only by visual notification. Specifically, a text message indicating that the electric parking is in operation is displayed on the display of the HMI 9. When the proficiency level of the driver is "medium", information is notified to the driver by visual notification and audible notification. More specifically, a text message indicating that the electric parking is in operation and a method of releasing the electric parking is displayed on the display of the HMI 9, and a notification sound (buzzer sound) is output from the speaker of the HMI 9. When the proficiency level of the driver is "low", information is notified to the driver by visual notification and audible notification. Specifically, in addition to the text message indicating that the electric parking is in operation and a method of releasing, an image indicating a method of releasing the electric parking is displayed on the display of the HMI 9, and the text message displayed on the display is output from the speaker of the HMI 9 as an audio message. Therefore, in the example of FIG. 4D, the lower the proficiency level of the driver, the larger the amount of information notified to the driver.

Note that the notification unit 25 may notify the driver of the information by only one of visual notification and audible notification. Further, the notification unit 25 may increase the notification intensity to the driver as the proficiency level of the driver decreases. This makes it possible to direct the attention of the driver having a low level of proficiency to the notification, and to prevent the driver having a high level of proficiency from feeling the notification troublesome. For example, if a visual notification is provided to the driver, the lower the proficiency level of the driver, the higher the brightness or saturation of the text message or the image. When an audible notification is provided to the driver, the lower the proficiency level of the driver, the higher the volume of the notification sound or voice message. If a tactile notification (e.g., vibration of the steering wheel or the seat belt) are provided to the driver, the lower the proficiency level of the driver, the greater the intensity of the vibration provided to the driver.

After the step S103, in the step S104, the notification unit 25 notifies the drivers of the information via the HMI 9 in accordance with the notification mode determined in the step S103. After the step S104, the control routine ends.

Second Embodiment

The information notification device according to the second embodiment is basically the same as the configuration and control of the information notification device according to the first embodiment except for the following points. Therefore, the second embodiment of the present disclosure will be mainly described below with respect to portions different from the first embodiment.

Figure 5:
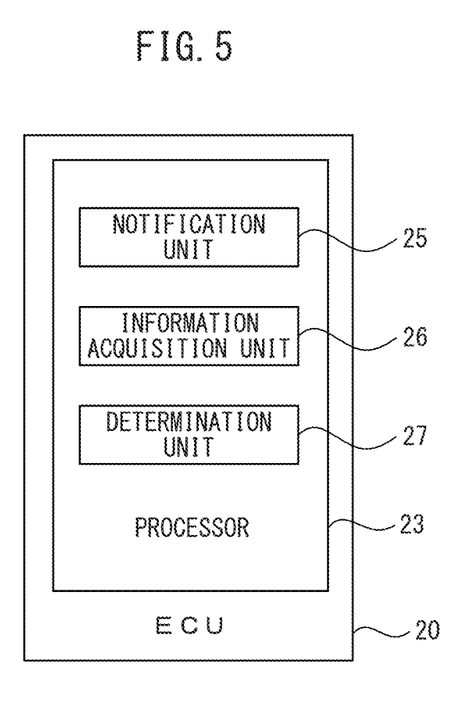
FIG. 5 is a functional block diagram of the processor of the ECU in the second embodiment.

FIG. 5 is a functional block diagram of the processor 23 of the ECU 20 according to the second embodiment. In the second embodiment, the processor 23 includes a determination unit 27 in addition to the notification unit 25 and the information acquisition unit 26. The notification unit 25, the information acquisition unit 26, and the determination unit 27 are functional modules realized by the processor 23 of the ECU 20 executing a computer program stored in the memory 22 of the ECU 20. Note that each of these functional modules may be realized by a dedicated arithmetic circuit provided in the processor 23.

The determination unit 27 determines the degree of proficiency of the driver with respect to the use of the driving assistance function based on the use state of the driving assistance function by the driver. This makes it possible to acquire the proficiency level of the driver without requiring the driver to report the proficiency level. Further, it is possible to obtain a more precise proficiency level by determining the proficiency level based on an objective determination criterion instead of the subjective view of the driver.

Figure 6:
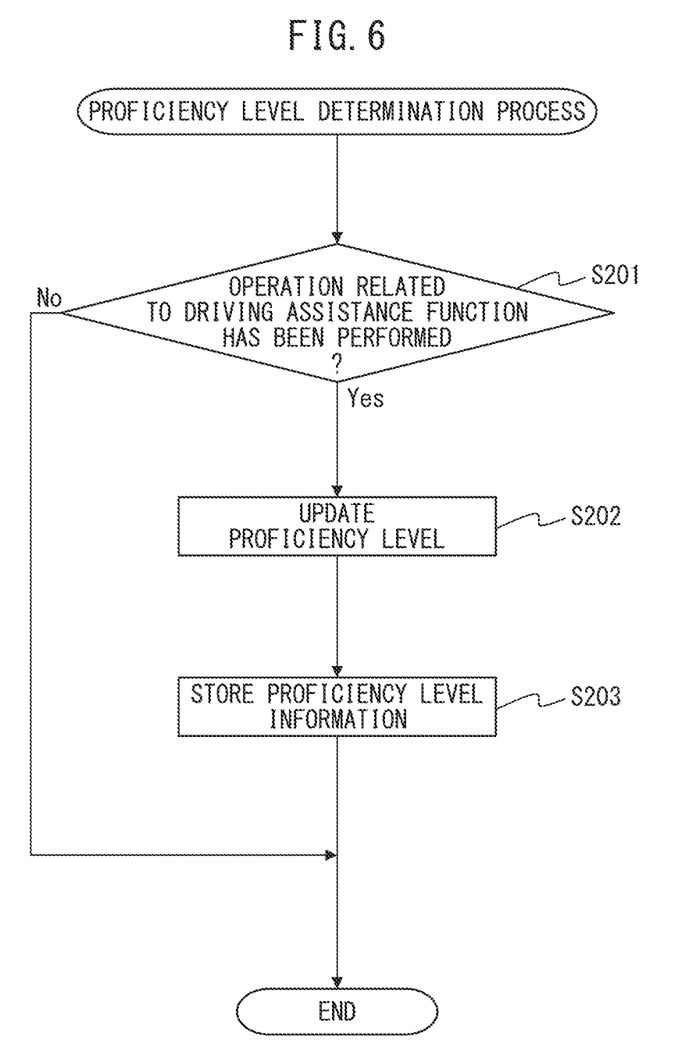
FIG. 6 is a flow chart showing the control routine of the proficiency level determination process in the second embodiment.

FIG. 6 is a flow chart showing the control routine of the proficiency level determination process according to the second embodiment. The control routine is repeatedly executed by the processor 23 (specifically, the determination unit 27) of the ECU 20 at predetermined intervals. When the plurality of driving assistance functions are installed in the vehicle, the present control routine is executed for each of the plurality of driving assistance functions.

First, in the step S201, the determination unit 27 determines whether or not the driver has performed an operation related to the driving assistance function. For example, the determination unit 27 determines whether or not an operation related to the driving assistance function has been performed based on, for example, an input to the HMI 9 by the driver. When the driving assistance function is advanced driving assistance, the operation related to the driving assistance function includes, for example, a switching operation of the HMI 9, an operation for eliminating the cause of the unavailability of the advanced driving assistance, etc. When the state in which the advanced driving assistance cannot be used is resolved, it is determined that an operation for eliminating the cause of the unavailability of the advanced driving assistance has been performed by the driver. When the driving assistance function is an electric parking, the operation related to the driving assistance function includes, for example, a switching operation of the HMI 9, an operation of an accelerator pedal for releasing the electric parking, etc.

When it is determined in the step S201 that an operation related to the driving assistance function has not been performed, the present control routine ends. On the other hand, if it is determined in step S201 that an operation related to the driving assistance function has been performed, the present control routine proceeds to step S202.

In the step S202, the determination unit 27 updates the proficiency level of the driver in response to the operation related to the driving assistance function. For example, the determination unit 27 calculates the frequency at which the operation related to the driving assistance function was performed, and updates the proficiency level based on the frequency. In this case, the higher the frequency, the higher the proficiency level. The proficiency level is defined by numerical values (e.g., 0 to 100) or ranks (e.g., low, medium, and high). The correspondence between the frequency and the numerical value or rank of the proficiency level is determined in advance by a map or a calculation formula. Note that when an operation for starting the driving assistance function is performed in a state where the driving assistance function cannot be used, the determination unit 27 may decrease the proficiency level of the driver. When the driving assistance function is advanced driving assistance, the determination unit 27 may determine the proficiency level of the driver based on the time required to eliminate the cause of unavailability of the advanced driving assistance. In this case, the shorter the time required to eliminate the cause, the higher the proficiency level of the driver.

Next, in the step S203, the determination unit 27 stores the proficiency level updated in the step S202 as proficiency level information in the memory 22 of the ECU 20, etc. The determination unit 27 may store the identification number of the wireless key existing inside the vehicle as the proficiency level information together with the proficiency level. Further, the determination unit 27 may store the image of the driver generated by the driver monitor camera 2 as the proficiency level information together with the proficiency level. According to these methods, the proficiency level of the driver determined by the determination unit 27 can be stored in association with the identification information of the driver. After the step S203, the control routine ends.

Further, in the second embodiment, as in the first embodiment, the control routine of information notification process in FIG. 3 is executed. At this time, in the step S101, the information acquisition unit 26 acquires the proficiency level information including the proficiency level determined by the determining unit 27. When the proficiency level information includes identification information of the driver, the information acquisition unit 26 identifies the driver and acquires proficiency level information corresponding to the identified driver. Thus, even if a plurality of persons use a single vehicle, it is possible to prevent the proficiency level of another person from being referred to.

Third Embodiment

The information notification device according to the third embodiment is basically the same as the configuration and control of the information notification device according to the first embodiment except for the points described below. Therefore, the third embodiment of the present disclosure will be mainly described below with respect to portions different from the first embodiment.

Figure 7:
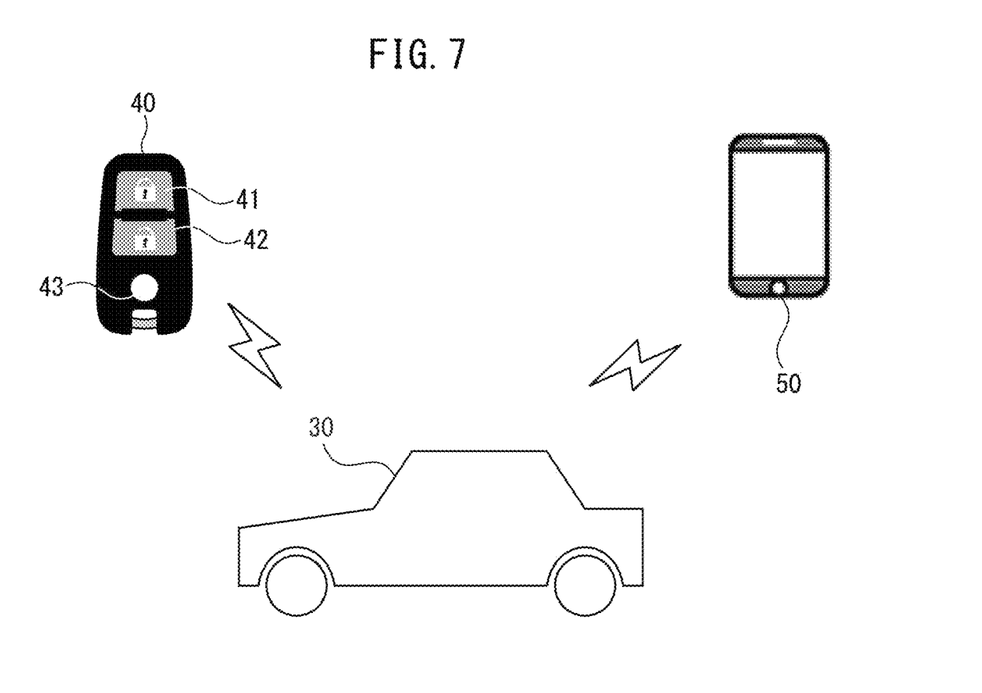
FIG. 7 is a diagram illustrating an example of a portable terminal capable of communicating with a vehicle.

FIG. 7 is an example of a portable terminal capable of communicating with a vehicle. The vehicle 30 includes the vehicle control system 1 shown in FIG. 1, and performs short-range wireless communication with a portable terminal carried by a driver via the short-range wireless communication module of the communication device 10.

In the third embodiment, the proficiency level information indicating the proficiency level of the driver is stored in the portable terminal, and the information acquisition unit 26 acquires the proficiency level information from the portable terminal via the short-range wireless communication. Thus, even if a plurality of persons use a single vehicle, it is possible to easily acquire the proficiency level of the driver riding on the vehicle 30. In addition, the storage capacity of the storage device of the vehicle 30, such as the memory 22 of the ECU 20, can be avoided from being consumed for the storage of proficiency level information.

In the third embodiment, as in the first embodiment, the control routine of information notification process is executed. At this time, in the step S101, the information acquisition unit 26 acquires the proficiency level information stored in the portable terminal from the portable terminal via the short-range wireless communication. Note that the portable terminal may be capable of communicating with a plurality of vehicles. In this case, notification of information based on the proficiency level of the owner of the portable terminal can be realized in each of the plurality of vehicles.

The portable terminal is, for example, a wireless key 40 of the vehicle 30. The wireless key 40 has an individual identification number, and a plurality of wireless keys 40 having different identification numbers are assigned to each of a plurality of users of the vehicle 30. For example, when the proficiency level is input by the driver via the HMI 9, the proficiency level information representing the proficiency level input by the driver is transmitted to the wireless key 40 existing inside the vehicle 30, and is stored in the memory of the wireless key 40.

In the present embodiment, the wireless key 40 includes, in addition to a lock button 41 and an unlock button 42 for opening and closing the door lock of the vehicle 30, an information transmission stop button 43 for stopping the transmission of the proficiency level information between the vehicle 30 and the wireless key 40. When the information transmission stop button 43 is operated (for example, long pressed), the transmission of the proficiency level information between the vehicle 30 and the wireless key 40, that is, the acquisition of the proficiency level information from the wireless key 40 and the update of the proficiency level information stored in the wireless key 40 are stopped. Therefore, even if the wireless key 40 is temporarily lent to a person other than the owner, it is possible to prevent the notification based on the proficiency level of the owner from being performed, and it is possible to prevent the proficiency level of the person other than the owner from being reflected in the proficiency level information.

The portable terminal in which the proficiency level information is stored may be a smartphone 50. The smartphone 50 is carried by each of a plurality of users of the vehicle 30. In this case, an application for information transfer is installed in the smartphone 50, and proficiency level information is transmitted between the vehicle 30 and the smartphone 50 via the application. For example, when the proficiency level is input by the driver via the HMI 9, the proficiency level information indicating the proficiency level input by the driver is transmitted to the smartphone 50 in which the application for transmitting information is installed, and is stored in the memory of the smartphone 50. The owner of the smartphone 50 may input the proficiency level on an application for information transfer, that is, on the smartphone 50. The smartphone 50 may also have a function of opening and closing a door lock of the vehicle 30. The portable terminal may be a tablet terminal, etc., owned by a user of the vehicle 30.

Fourth Embodiment

The information notification device according to the fourth embodiment is basically the same as the configuration and control of the information notification device according to the first embodiment except for the points described below. Therefore, the fourth embodiment of the present disclosure will be mainly described below with respect to portions different from the first embodiment.

Figure 8:
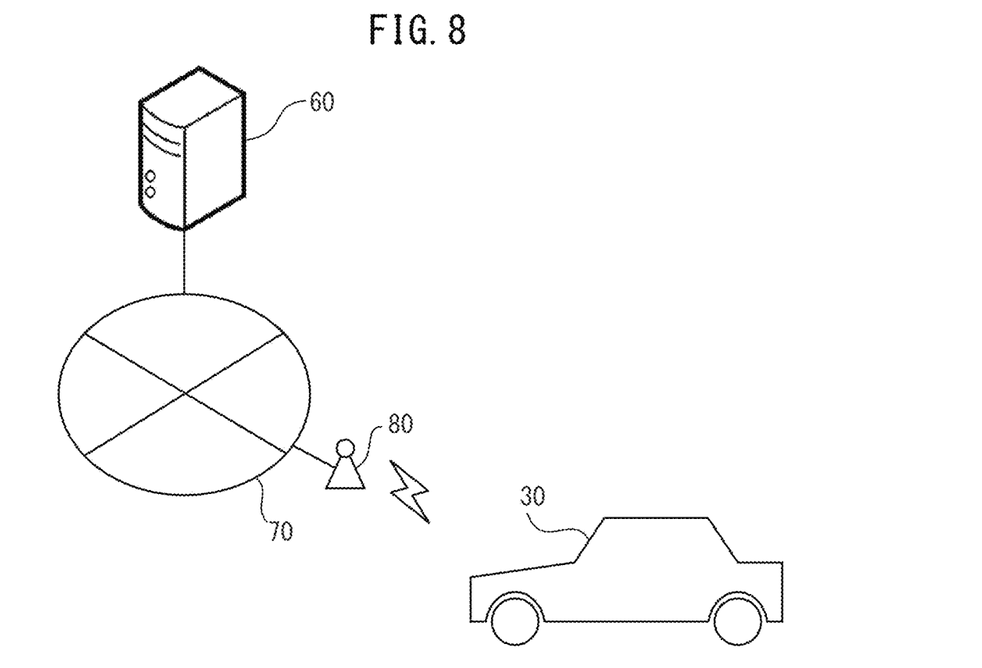
FIG. 8 is a diagram illustrating an example of a server capable of communicating with a vehicle.

FIG. 8 is a diagram illustrating an example of a server capable of communicating with a vehicle. The vehicle 30 includes the vehicle control system 1 shown in FIG. 1, and performs wide area wireless communication with the server 60 outside the vehicle 30 via the wide area wireless communication module of the communication device 10. Specifically, the vehicle 30 accesses the radio base station 80 using the communication device 10 and communicate with the server 60 via the radio base stations 80 and the communication network 70. The serves 60 includes a communication interface, a storage device, a memory, a processor, etc.

In the fourth embodiment, the proficiency level information indicating the proficiency level of the driver is stored in the server 60, and the information acquisition unit 26 acquires the proficiency level information from the server 60 via the wide area wireless communication. This makes it possible to avoid that the storage capacity of the storage device of the vehicle 30, such as the memory 22 of the ECU 20, is consumed for the storage of the proficiency level information.

For example, when the proficiency level is input by the driver via the HMI 9, the proficiency level information indicating the proficiency level input by the driver is transmitted from the vehicle 30 to the server 60 via the wide area wireless communication. When the proficiency level is input by the driver, the identification number of the wireless key existing inside the vehicle 30 may be transmitted to the server 60 as the proficiency level information together with the proficiency level. Further, when the proficiency level is input by the driver via the HMI 9, the image of the driver generated by the driver monitor camera 2 may be transmitted to the server 60 as the proficiency level information together with the proficiency level. Further, the driver may input identification information (for example, a user ID, a user name, etc.) of the driver together with the proficiency level, and the identification information of the driver may be transmitted to the server 60 as the proficiency level information together with the proficiency level. According to these methods, even if a plurality of persons use a single vehicle, it is possible to prevent the proficiency level of another person from being referred to.

Further, in the fourth embodiment, as in the first embodiment, the control routine of information notification process in FIG. 3 is executed. At this time, in the step S101, the information acquisition unit 26 acquires the proficiency level information stored in the server 60 from the server 60 via the wide-area wireless communication. If the identification information of the driver is stored in the server 60, the information acquisition unit 26 transmits information for identifying the driver (for example, the identification number of the wireless key of the vehicle 30, the image of the driver generated by the driver monitor camera 2, the identification information input by the driver, etc.) to the server 60. As a result, the server 60 can identify the driver riding on the vehicle 30 and acquire the proficiency level information of the identified driver.

Note that statistical information on the proficiency level (for example, comparative information with other users), etc., may be generated in the server 60, and the statistical information may be transmitted from the server 60 to the vehicle 30 and notified to the driver of the vehicle 30 via the HMI 9.

OTHER EMBODIMENTS

While preferred embodiments of the present disclosure have been described above, the present disclosure is not limited to these embodiments, and various modifications and changes can be made within the scope of the claims.

For example, a part of the configuration of the vehicle control system 1 shown in FIG. 1 may be omitted. Further, the driving assistance function installed in the vehicle may be an adaptive cruise control (ACC) that automatically controls the velocity of the vehicle according to the presence or absence of the preceding vehicle, a lane keeping assist (LKA) or a lane tracing assist (LTA) that automatically controls the steering of the vehicle so that the vehicle is maintained in the lane, etc.

In addition, a computer program that causes a computer to realize the functions of the respective units included in the processor 23 of the ECU 20 may be provided in a form stored in a computer-readable recording medium. The computer-readable recording medium is, for example, a magnetic recording medium, an optical recording medium, or a semiconductor memory.

Further, the above-described embodiments can be implemented in any combination. For example, when the second embodiment and the third embodiment are combined, the proficiency level information indicating the proficiency level determined by the determination unit 27 is stored in the portable terminal (for example, the wireless key 40 or the smartphone 50), and the information acquisition unit 26 acquires the proficiency level information from the portable terminal via the short-range wireless communication. When the second embodiment and the fourth embodiment are combined, the proficiency level information indicating the proficiency level determined by the determination unit 27 is stored in the server 60, and the information acquisition unit 26 acquires the proficiency level information from the server 60 via the wide area wireless communication.

REFERENCE SIGNS LIST

20 Electronic control unit (ECU)
23 Processor
25 Notification unit
26 Information acquisition unit
30 Vehicle

The invention claimed is:

1. An information notification device, comprising a processor configured to:
   notify a driver of a vehicle of information;
   acquire proficiency level information indicating a proficiency level of the driver with respect to use of a driving assistance function installed in the vehicle; and
   switch a notification mode of information related to the driving assistance function based on the proficiency level information, wherein
   the processor is further configured to increase a notification intensity of information to be notified to the driver as the proficiency level of the driver decreases.

2. The information notification device according to claim 1, wherein the processor is further configured to increase an amount of information to be notified to the driver as the proficiency level of the driver decreases.

3. The information notification device according to claim 1, wherein the processor is further configured to determine the proficiency level of the driver based on a usage status of the driving assistance function by the driver.

4. The information notification device according to claim 1, wherein the proficiency level information is stored in a portable terminal carried by the driver, and the processor is configured to acquire the proficiency level information from the portable terminal through a short-range wireless communication.

5. The information notification device according to claim 4, wherein the portable terminal is a wireless key of the vehicle.

6. The information notification device according to claim 1, wherein the proficiency level information is stored in a server external to the vehicle, and the processor is configured to acquire the proficiency level information from the server through a wide-area wireless communication.

7. The information notification device according to claim 1, wherein
   the notification intensity of information includes at least one of:
   (1) a brightness or saturation of text message or image,
   (2) volume of notification sound or voice message, or
   (3) intensity of vibration of a steering wheel or a seat belt of the vehicle.

8. The information notification device according to claim 1, wherein
   the processor is further configured to acquire the proficiency level information via an interface which is configured to:
   (1) receive the proficiency level information manually input by the driver, or
   (2) automatically determine the proficiency level information of the driver by a switching operation of the interface.

9. The information notification device according to claim 1, wherein
   the processor is further configured to update the proficiency level of the driver in response to operation related to the driving assistance function.

10. The information notification device according to claim 1, wherein
   the processor is further configured to:
   calculate a frequency at which operation related to the driving assistance function is performed, and
   update the proficiency level based on the frequency.

11. An information notification method executed by a computer, the method comprising:
acquiring proficiency level information indicating a proficiency level of a driver of a vehicle with respect to use of a driving assistance function installed in the vehicle;
switching a notification mode of information related to the driving assistance function based on the proficiency level information when notifying the driver of information related to the driving assistance function; and
increasing a notification intensity of information to be notified to the driver as the proficiency level of the driver decreases.

12. The information notification method according to claim 11, wherein
the notification intensity of information includes at least one of:
(1) a brightness or saturation of text message or image,
(2) volume of notification sound or voice message, or
(3) intensity of vibration of a steering wheel or a seat belt of the vehicle.

13. The information notification method according to claim 11, wherein
the proficiency level information is acquired via an interface which
(1) receives the proficiency level information manually input by the driver, or
(2) automatically determines the proficiency level information of the driver by a switching operation of the interface.

14. The information notification method according to claim 11, further comprising:
updating the proficiency level of the driver in response to operation related to the driving assistance function.

15. The information notification method according to claim 11, further comprising:
calculating a frequency at which operation related to the driving assistance function is performed; and
updating the proficiency level based on the frequency.

16. A non-transitory recording medium having recorded thereon a computer program, the computer program executable by a computer to cause the computer to:
acquire proficiency level information indicating a proficiency level of a driver of a vehicle with respect to use of a driving assistance function installed in the vehicle,
switch a notification mode of information related to the driving assistance function based on the proficiency level information when notifying the driver of information related to the driving assistance function, and
increase a notification intensity of information to be notified to the driver as the proficiency level of the driver decreases.

17. The non-transitory recording medium according to claim 16, wherein
the notification intensity of information includes at least one of:
(1) a brightness or saturation of text message or image,
(2) volume of notification sound or voice message, or
(3) intensity of vibration of a steering wheel or a seat belt of the vehicle.

18. The non-transitory recording medium according to claim 16, wherein
the computer program further causes the computer to acquire the proficiency level information via an interface which is configured to:
(1) receive the proficiency level information manually input by the driver, or
(2) automatically determine the proficiency level information of the driver by a switching operation of the interface.

19. The non-transitory recording medium according to claim 16, wherein
the computer program further causes the computer to update the proficiency level of the driver in response to operation related to the driving assistance function.

20. The non-transitory recording medium according to claim 1, wherein
the computer program further causes the computer to:
calculate a frequency at which operation related to the driving assistance function is performed, and
update the proficiency level based on the frequency.

* * * * *